United States Patent [19]

Higuchi

[11] Patent Number: 4,683,391
[45] Date of Patent: Jul. 28, 1987

[54] MAGNETICALLY FLOATING ACTUATOR HAVING ANGULAR POSITIONING FUNCTION

[75] Inventor: Toshiro Higuchi, Yokohama, Japan

[73] Assignee: Nippon Seiko Kabushiki Kaisha, Tokyo, Japan

[21] Appl. No.: 840,813

[22] Filed: Mar. 18, 1986

[30] Foreign Application Priority Data

Mar. 22, 1985 [JP] Japan .................................. 60-56024

[51] Int. Cl.$^4$ .............................................. F16C 39/06
[52] U.S. Cl. .................................. 310/90.5; 310/49 R
[58] Field of Search .................... 310/49 R, 90.5, 268; 51/134.5 R

[56] References Cited

U.S. PATENT DOCUMENTS

| | | | |
|---|---|---|---|
| 3,376,578 | 4/1968 | Sawyer | 335/268 |
| 3,845,995 | 11/1974 | Wehde | 310/90.5 |
| 3,888,553 | 6/1975 | Wehde | 310/90.5 |
| 3,976,339 | 8/1976 | Sabnis | 310/90.5 |
| 4,121,143 | 10/1978 | Habermann | 310/90.5 |
| 4,180,946 | 1/1980 | Heijkenskjold | 310/90.5 |
| 4,483,570 | 11/1984 | Inove | 310/90.5 |
| 4,523,896 | 6/1985 | Lhenry | 310/90.5 |

FOREIGN PATENT DOCUMENTS

59-89820  5/1984  Japan .................................. 310/90.5

*Primary Examiner*—R. Skudy
*Attorney, Agent, or Firm*—Armstrong, Nikaido, Marmelstein & Kubovcik

[57] ABSTRACT

An actuator is provided with a rotor formed to include teeth at a predetermined pitch and a rotation control coil is wound on each of plural pole pieces formed on a core member opposing the rotor, the coils forming first, second, third and fourth magnetic poles. The rotor is rotatatively driven and angularly positioned by attracting forces between the magnetic poles and the teeth of the rotor. Magnetic flotation coils are wound on the base portion of the magnetic member to form magnetic flotation poles. The rotor is floated magnetically by attracting forces between the magnetic flotation poles and the teeth of the rotor. In an embodiment, the rotor is provided with grooves crossing the teeth to form the teeth into a mesh-like configuration. The mesh-like teeth cooperate with the magnetic poles to provide a holding force in the axial direction, so that a function equivalent to that of a thrust bearing may be performed.

9 Claims, 21 Drawing Figures

Stability Point at Positive Ia

Fig. 6(b)

Stability Point at Positive Ib

Fig. 6(c)

Stability Point at Negative Ia

MAGNETICALLY FLOATING ACTUATOR HAVING ANGULAR POSITIONING FUNCTION

BACKGROUND OF THE INVENTION

This invention relates to a magnetically floating actuator having an angular positioning function which enables a rotor to be angularly positioned at will and which makes it possible to float the rotor magnetically and support it on a stationary member in a contactless manner.

In recent years demand has grown for an actuator suitable for use in a strictly controlled environment (e.g., an environment that demands a dust-free, noise-free, vibration-free or high-vacuum condition) and having a highly accurate angular positioning function.

More specifically, in a semiconductor manufacturing process, by way of example, fine machining on the order of microns to submicrons is required, so that the occurrence of dust is a significant problem since dust particles can have a major influence upon the semiconductor manufacturing yield. This makes it absolutely essential to prevent dust from being produced by the rotating parts of machinery. With conventional motors, however, the state of the art is such that the scattering of grease and minute particles produced by metal wear occurring at bearings cannot be avoided.

The above requirement is not limited to the field of semiconductor manufacture but also holds for various positioning mechanisms, machine tools, automatic machinery, conveyance machinery and robots that find use in vacuum, underwater or in extremely hostile environments, namely at locations or in environments where ordinary roller bearings, sliding bearings and fluid bearings cannot be employed.

An actuator of the above-described type not only should be mechanically contactless but preferably has a control system which is as simple as possible, such as a control system which does not require the provision of a rotational angle sensor for positioning.

What is first called to mind from the existing art under these circumstances is a magnetic bearing.

Conventionally, a magnetic bearing is used for supporting a rotary body in a contactless state and obtains the rotary body supporting force by utilizing magnetic attraction or repulsion.

Figure 1:
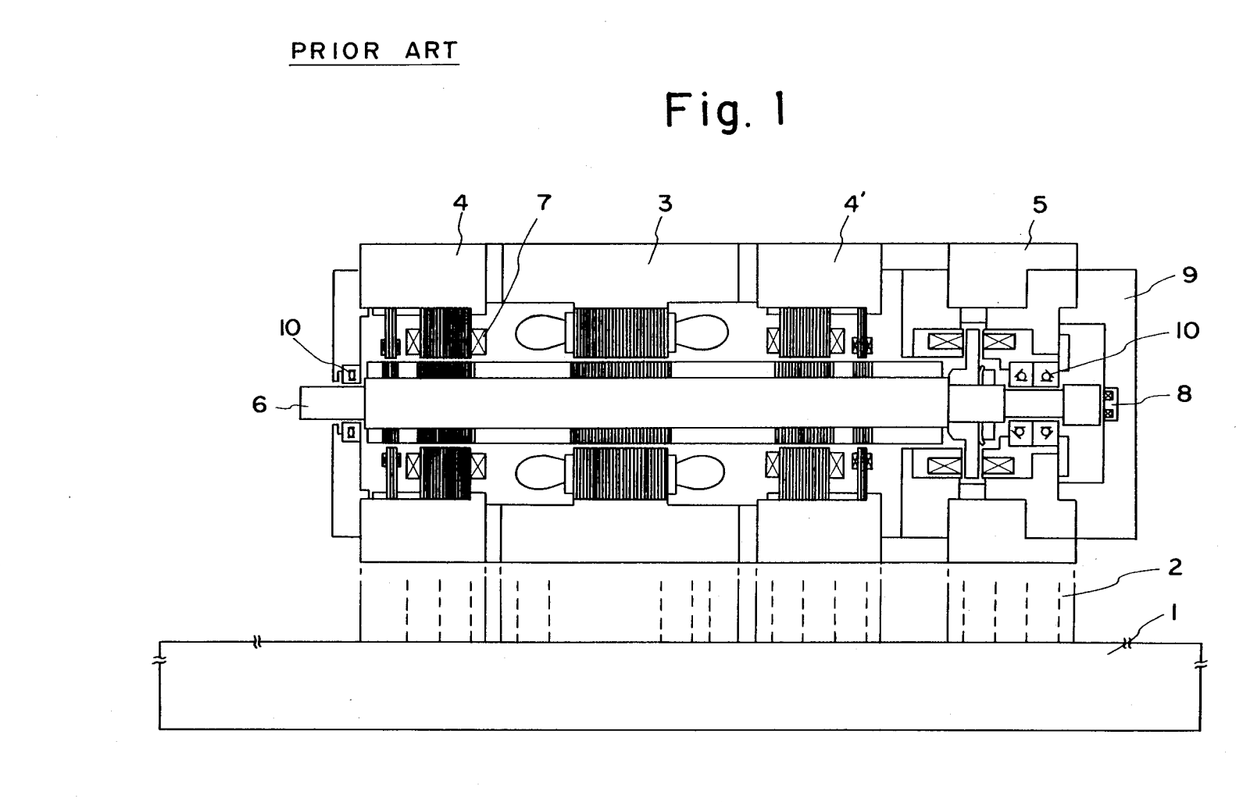
FIG. 1 is a sectional view showing a magnetic bearing-type motor according to the prior art.

FIG. 1 is a sectional view illustrating a motor of the type that uses such a magnetic bearing. As illustrated, a high-frequency motor 3 having a magnetic bearing is mounted on a base 1 through the intermediary of a vibration absorbing buffer 2. The magnetic bearing is composed of radial bearing units 4, 4' provided on either side of the high-frequency motor 3, and a thrust bearing unit 5 arranged at one end of a rotor 6. These units 4, 4', 5 are magnetically floated by electromagnets. An emergency bearing 10 is provided between the rotor 6 and an outer frame 9.

Displacement of the rotor 6 in the radial direction is sensed by a radial sensor 7, and displacement of the rotor 6 in the thrust direction is sensed by a thrust sensor 8. The position of the rotor 6 is controlled to assume a prescribed position by adjusting the attracting force of the electromagnet associated with the magnetic bearing.

Thus, in order to support the rotor 6 in a perfectly contactless state in the conventional magnetic bearing, it is necessary to control displacement or inclination in at least one degree of freedom. In other words, it is necessary to sense the gap between the rotor and a stator and control the attracting force of the electromagnet so as to hold the gap constant.

Meanwhile, control of the rotational motion of the rotor 6 is performed entirely independently of the magnetic bearing mechanism for contactless support. For example, there are many cases where the rotor is driven by the motor in the manner illustrated in FIG. 1, and the motor usually is an induction-type high-frequency motor. There are also cases where the rotational power is obtained by transmitting rotation, which is acquired externally via a joint, by means of a coupling. In either case, the magnetic bearing mechanism and the rotary drive mechanism are separable and are merely mechanically integrated. In other words, though the magnetic bearing section and the rotary drive section are integrated in mechanical terms, they clearly can be separated from each other. In addition, in order to drive the rotor 6 supported by the pair of radial magnetic bearings 4, 4', an induction-type high-frequency motor is almost always used. This motor is employed for effecting rotation at a high or constant velocity. In short, control of the rotor is exclusively for controlling rotational velocity and does not find use in controlling angular position. Prior art of this kind is disclosed in the specification of Japanese Patent Application Laid-Open No. 59-89820, by way of example.

An inductor motor having a magnetic bearing generally is not used in angular positioning, as mentioned above. If it is attempted to perform angular positioning by using such an induction motor, it is necessary to additionally provide a sensor of some kind for sensing the angle of rotation because the motor itself does not possess an angular positioning function. Accordingly, angular positioning must be carried out based on the output of the sensor. An example of such prior art is given in the specification of U.S. Pat. No. 4,180,946.

SUMMARY OF THE INVENTION

An object of the present invention is to provide a magnetically floating actuator having an angular positioning function, which actuator is simplified in structure and rendered compact in size by integrating a magnetic bearing, a rotary shaft drive mechanism and a rotational angle positioning mechanism.

Another object of the present invention is to provide a magnetically floating actuator having an angular positioning function, which actuator controls a rotary shaft in a contactless state, performs highly precise angular positioning and suppresses axial movement of a rotor.

According to the present invention, the foregoing objects are attained by providing a magnetically floating actuator having an angular positioning function, the actuator comprising a rotor having teeth spaced at a predetermined pitch, and a stator which includes rotor magnetic flotation means and rotation control means provided on a core member forming magnetic poles opposing the teeth. The rotation control means comprises a rotation control coil wound on each magnetic pole of the core member and supplied with phase-controlled currents, and the magnetic flotation means comprises a magnetic flotation coils wound on a base portion of the core member adjacent the rotation control coils and supplied with excitation currents.

In an embodiment of the invention, the actuator comprises a motor having mesh-like teeth spaced at a predetermined pitch, and a stator which includes rotor magnetic flotation means and rotation control means provided on a core member forming magnetic poles opposing the teeth, whereby at least axial movement of the rotor is suppressed.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 4 (a), (b) are views useful in describing an electromagnet block;

FIGS. 8(a), (b) for describing a drive current for rotational control;

DESCRIPTION OF THE PREFERRED EMBODIMENT

An embodiment of the present invention will now be described in detail with reference to the drawings.

Figure 2:
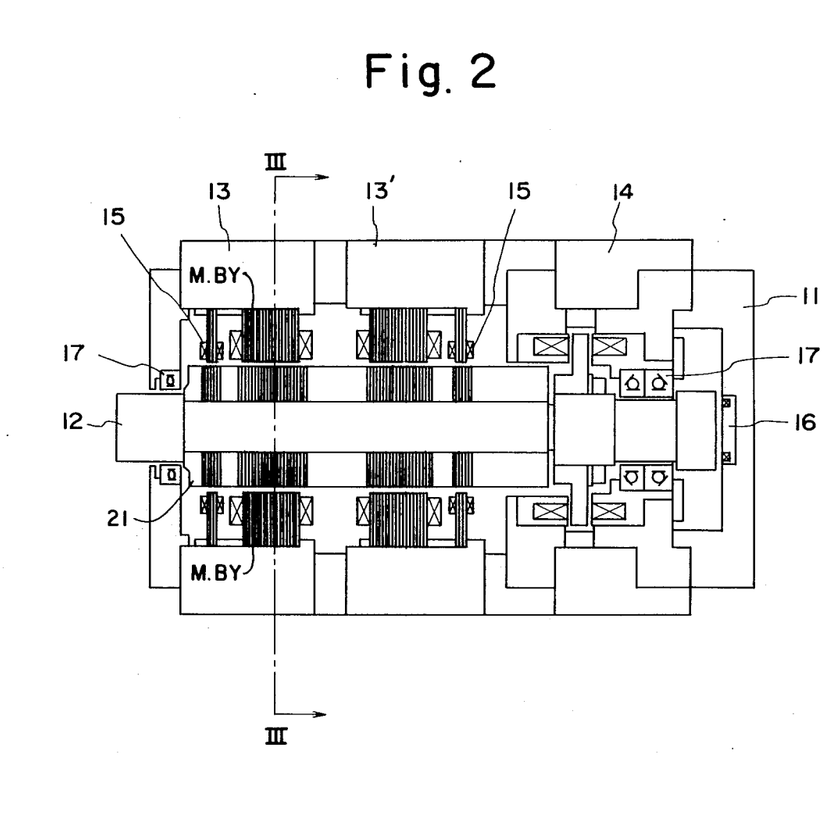
FIG. 2 is a sectional view showing a magnetically floating actuator having an angular positioning function according to the present invention.

As shown in FIG. 2, an actuator according to the present invention includes an outer frame 11, a rotor shaft 12, electromagnet blocks 13, 13', a thrust bearing 14, a radial sensor 15, a thrust sensor 16 and an emergency bearing 17. According to the present invention as illustrated, the motor section of the magnetic bearing-type motor is inseparably integrated with the magnetic bearing, unlike the prior art, and the actuator includes the electromagnet blocks 13, 13' having an angular positioning function.

Figure 3:
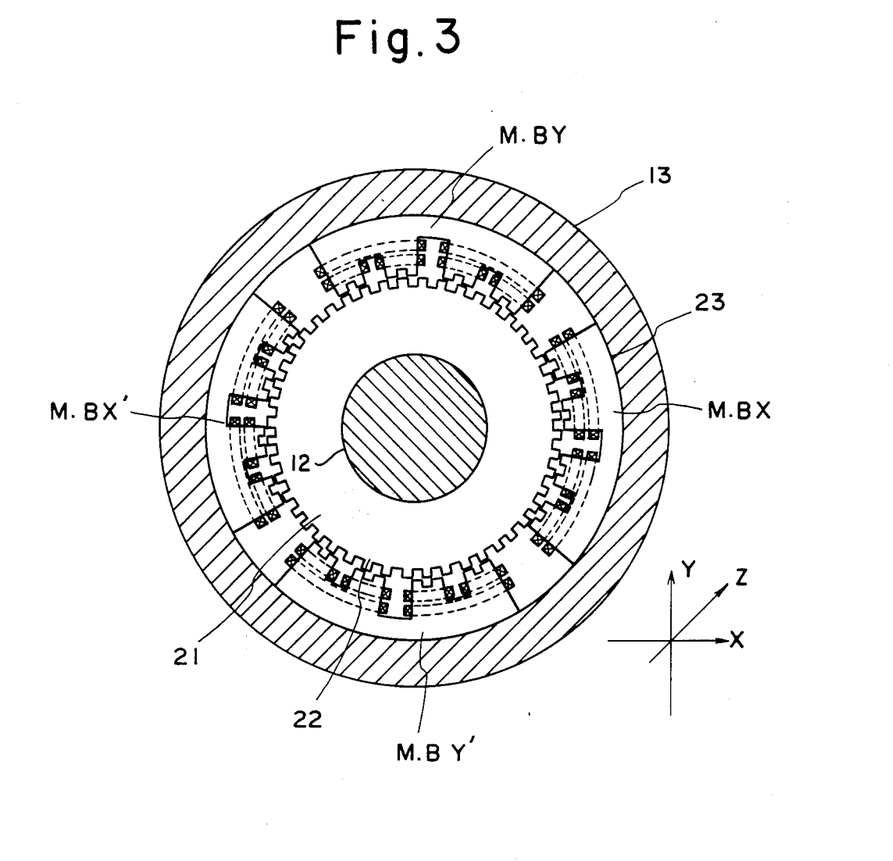
FIG. 3 is a sectional view taken along line III—III of FIG. 2.

FIG. 3 is a sectional view taken along line III—III of FIG. 2 and illustrating the electromagnet block 13. A rotor 21 is formed on the rotor shaft 12 to include a number of circumferential teeth 22 having a predetermined width, with the spacing between the teeth 22, namely the pitch of the teeth, being set to a predetermined value. To float the rotor 21 magnetically and achieve rotational drive and angular positioning, the rotor 21 is provided with a stator 23 having two pairs of electromagnet blocks at positions spaced away from the rotor 21 so that a gap is defined between the rotor 21 and the electromagnet blocks. Thus, four electromagnet blocks, denoted M.B X, M.B X', M.B Y, M.B Y', are arranged in the stator 23. In the illustrated embodiment, the arrangement is such that the electromagnets M.B X, M.B X', as well as the electromagnets M.B Y, M.B Y', are symmetrically located with respect to the center of the rotor 21.

It should be noted that if a sectional view were taken along line A—A of FIG. 2 and illustrating the electromagnet block 13' it would be identical to the sectional view of FIG. 3.

Figure 4A:
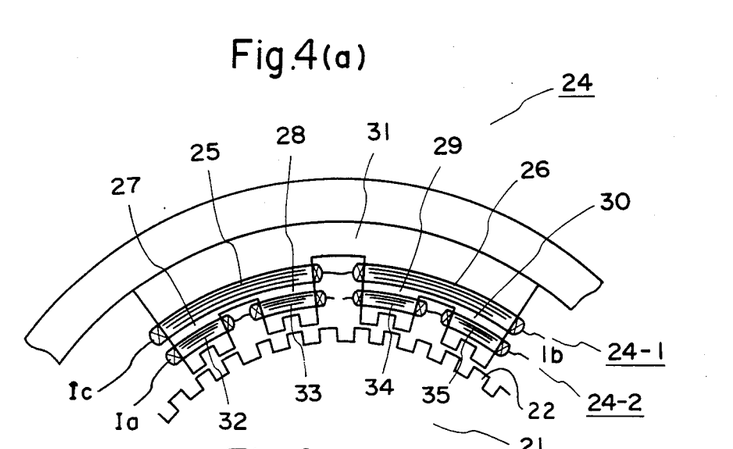
Figure 4B:
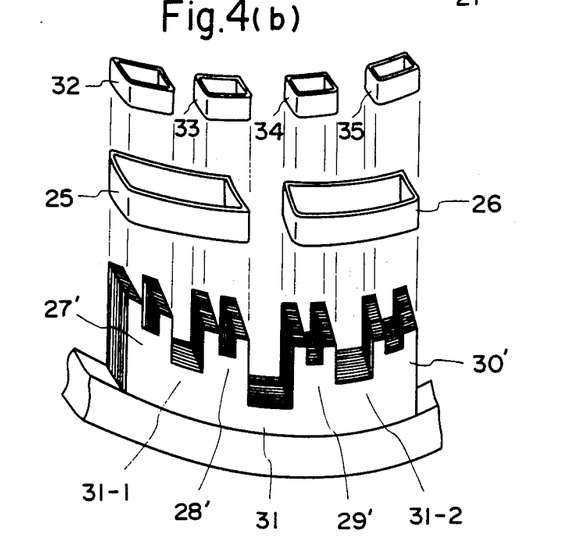

As shown in FIGS. 4(a), 4(b), each electromagnet block 24 has a group of magnetic poles 24-1 for attracting and holding the rotor 21 in a magnetically floating state, and a group of control magnetic poles 24-2 for controlling the angular position of rotor 21. As shown in FIG. 2, the radial sensor 15 for sensing radial displacement of the rotor and the thrust sensor 16 for sensing displacement of the rotor in the thrust direction are provided. Output signals from these sensors 15, 16 are read into an electronic control unit (not shown) for controlling the position of the rotor 21.

As shown in FIGS. 4(a), 4(b), each electromagnet block 24 comprises a core member 31, magnetic flotation coils 25, 26 constituting the magnetic pole group 24-1 and wound on the core member 31, and rotation control coils 32, 33, 34 and 35 constituting the magnetic pole group 24-2 comprising a first magnetic pole 27, a second magnetic pole 28, a third magnetic pole 29 and a fourth magnetic pole 30.

The core member 31 consists of stacked, strongly magnetic material such as electromagnetic steel plates die-punched from a plate into a shape having two connected recessed portions. The magnetic flotation coils 25, 26 are wound serially on the outer periphery of recessed portions 31-1, 31-2 of the core member 31 so as to have mutually opposing polarities, thus forming the magnetic pole group 24-1 for magnetic flotation.

The tips of the core member 31 comprise a first pole piece 27', a second pole piece 28', a third pole piece 29', and a fourth pole piece 30', respectively. The rotation control coils 32, 33, 34 and 35 are wound on the pole pieces 27', 28', 29' and 30', respectively, thereby forming the first, second, third and fourth magnetic poles 27, 28, 29 and 30, respectively. Teeth provided on the magnetic poles 27, 28, 29, 30 have a pitch the same as that of the teeth on the rotor 21. However, as shown in FIG. 3, the pitch of these magnetic pole teeth is shifted in phase with respect to the pitch of the rotor teeth. The arrangement is such that the poles may be arranged in pairs or groups, with the first magnetic pole 27 of the first pair serving as a reference, the second magnetic pole 28, of the first pair (a second magnetic pole), first magnetic pole 29 of the second pair (a third magnetic pole) and second magnetic pole 30 of the second pair (a fourth magnetic pole) are shifted by $\frac{1}{2}$ pitch, $\frac{1}{4}$ pitch and $\frac{3}{4}$ pitch, respectively, relative to the pitch of the teeth 22 provided on the rotor. It is also possible to shift the magnetic pole 29 by $\frac{3}{4}$ and the magnetic pole 30 by $\frac{1}{4}$, in which case the only difference will be that rotation will be in the opposite direction.

Figure 5A:
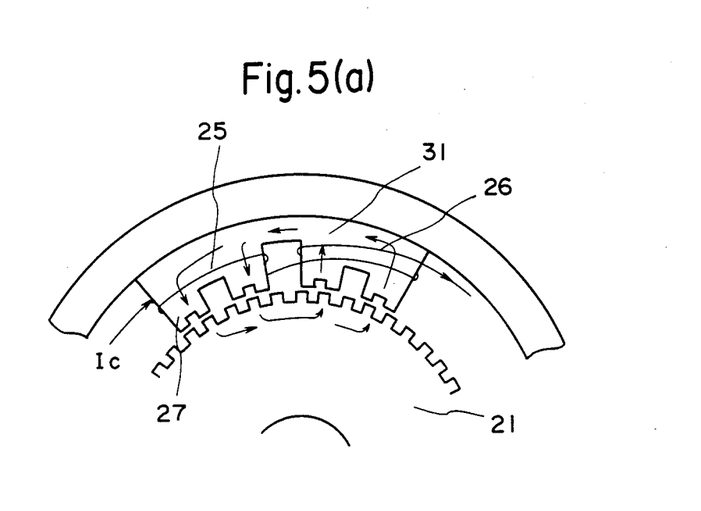
FIGS. 5(a), (b), (c), 6(a), (b), (c) and 7, are views for describing the operation of the electromagnet block.
Figures 5B, 5C:
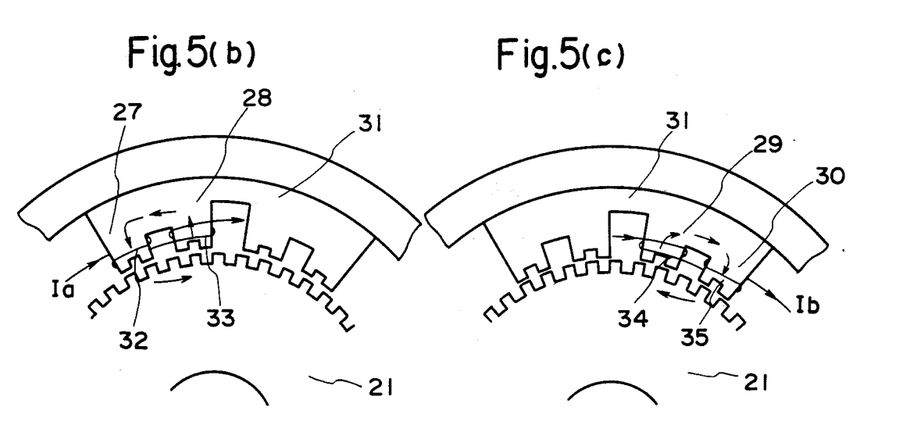

FIGS. 5(a), 5(b), (c) are views for describing the operation of the electromagnet blocks.

(1) If an electric current Ic is passed solely through the magnetic flotation coils 25, 26 in the direction of the arrow (assumed to be the positive direction), as shown in FIG. 5(a), magnetomotive forces are produced and fluxes are caused to flow in the directions illustrated.

(2) If an electric current Ia is passed solely through the rotation control coils 32, 33 in the direction of the arrow (assumed to be the positive direction), as shown in FIG. 5(b), magnetomotive forces are produced and fluxes flow in the directions illustrated. If the current is passed through these coils in the negative direction, the magnetomotive forces reverse direction so that the fluxes also flow in the opposite direction.

(3) If an electric current Ib is passed solely through the rotation control coils 34, 35 in the direction of the arrow (assumed to be the positive direction), as shown in FIG. 5(c), fluxes flow in the directions illustrated.

Figure 6A:
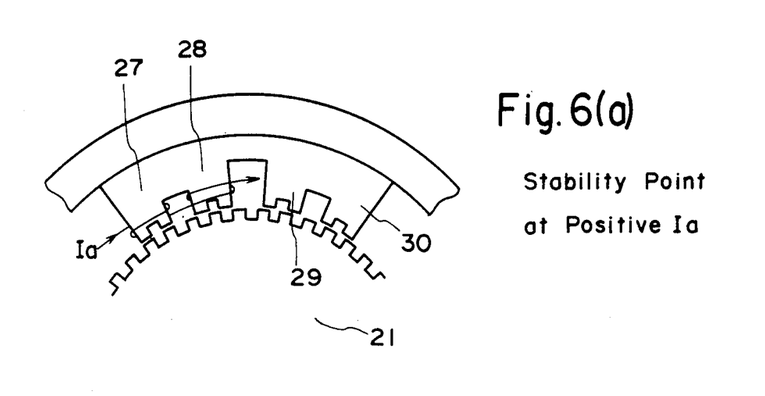

Accordingly, if a constant current Ic is passed through the magnetic flotation coils 25, 26, that is, if the magnetomotive forces are generated to give rise to the fluxes shown in FIG. 5(a), and if the positive current Ia shown in FIG. 5(b) is passed through the rotation control coils 32, 33 at the same time, then the magnetomotive forces due to the currents Ic, Ia will reinforce each other at the first magnetic pole 27 and the magnetomotive forces due to the currents Ic, Ia will cancel each other at the second magnetic pole 28, thus generating a force that will stabilize the rotor 21 at the position shown in FIG. 6(a). In other words, the rotor 21 is stabilized in such a manner that the teeth of the first magnetic pole 27 coincide with the teeth on the rotor 21.

Figure 6B:
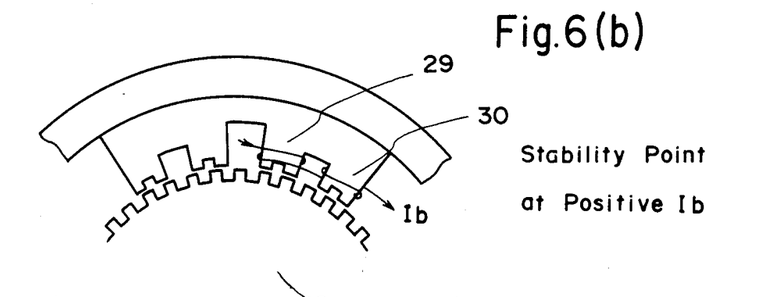

Next, if the current Ia is made zero and the current Ib is made positive, a flux attempts to flow through the third magnetic pole 29 and the rotor 21 develops a torque and is rotated by ¼ pitch so as to be stabilized at the position shown in FIG. 6(b).

Figure 6C:
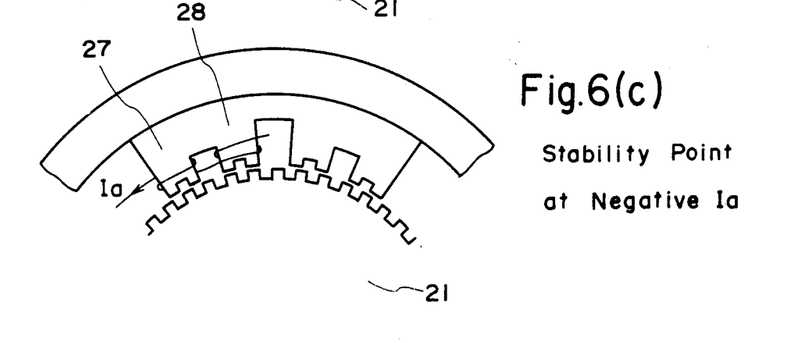

If the current Ib is then made zero and the current Ia is made negative, the magnetomotive forces now reinforce each other at the second magnetic pole 28 and fluxes flow to rotate the rotor 21 further, as shown in FIG. 6(c). In short, therefore, the rotor 21 will be made to rotate through ¼ pitch increments by switching the currents flowing through the rotation control coils 32, 33 and 34, 35 in the following manner: Ia (positive)→Ib (positive)→Ia (negative)→Ib (negative)→(Ia) positive.

The rotating principle of the rotor 21 is the same as the driving principle of a well known stepping motor disclosed in U.S. Pat. No. 3,376,578 to Sawyer. A Sawyer motor is a form of stepping motor utilized in a linear stepping motor and generally obtains the magnetomotive forces of the coils 25, 26 by means of permanent magnets. Accordingly, rotationally driving and positioning the above rotor can be achieved by adopting a method similar to that used in a stepping motor.

In actuality, an electromagnetic force that attracts the rotor in the direction of the electromagnet block in addition to the rotational direction is produced. In an ordinary stepping motor, the electromagnetic force attracting the rotor in the direction of the electromagnet block is received by the roller bearings at both ends of the rotor and a prescribed gap is maintained between the rotor and the stator.

In the present embodiment, skilled use is made of the electromagnetic force that attracts the rotor in the direction of the electromagnet blocks, thereby to provide a simple magnetically floating actuator having an angular positioning function which dispenses with the mechanical bearing mechanism such as the roller bearings seen in the ordinary stepping motor. This will now be described in detail.

Let us first discuss magnetically floating contactless support of the rotor 21 along the X axis. What follows will also hold for such support along the Y axis. As shown in FIG. 3, the stator 23 is so arranged that the electromagnet blocks X, X' are disposed at symmetrical positions with respect to the center of the rotor 21. Displacement of the rotor 21 along the X axis is sensed by the contactless displacement sensor 15 (FIG. 2). The rotor 21 can be magnetically floated and supported at a predetermined position along the X axis by controlling the attracting forces acting upon the rotor 21 from the electromagnet blocks X, X' on the basis of the output signal produced by the sensor 15. The attracting force from the electromagnet block X acting upon the rotor 21 to magnetically support it is derived from the magnetomotive forces of the magnetic flotation coils 25, 26 of the electromagnet block, and the attracting force is controlled by controlling the current flowing through the coils 25, 26. In other words, the excitation current Ic of the magnetic flotation coils 25, 26 does not merely act to drive the rotor 21 but is also used to produce an attracting force between the rotor 21 and the electromagnet block for the purpose of magnetically floating the rotor. Controlling this current Ic by means of an electronic control unit (not shown) enables the magnetically floating state of the rotor 21 to be controlled. Let us now describe this in further detail.

Figures 8A, 8B:
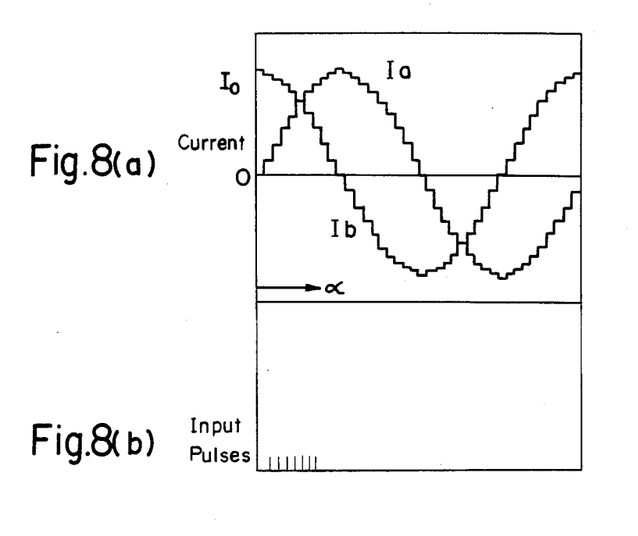

Though there may be some apprehension that the above-described magnetic flotation means will influence the attracting forces which the rotation control coils 32, 33, 34, 35 for rotation or positioning exert upon the rotor 21, this can be dealt with in the following manner:

(1) Let us consider the attracting force between one electromagnet block and the rotor. If the currents Ia, Ib shown in FIG. 8 are made to flow so to satisfy the relations Ia=Io sin α, Ib=Io cos α(this corresponding to microstep drive of a step motor), then the magnetomotive forces produced by these currents Ia, Ib will have almost no influence upon the attracting force between the electromagnet block and the rotor. Moreover, even though the rotor is formed to include teeth, it can be arranged so that the attracting force will depend solely upon the current Ic.

Figure 7:
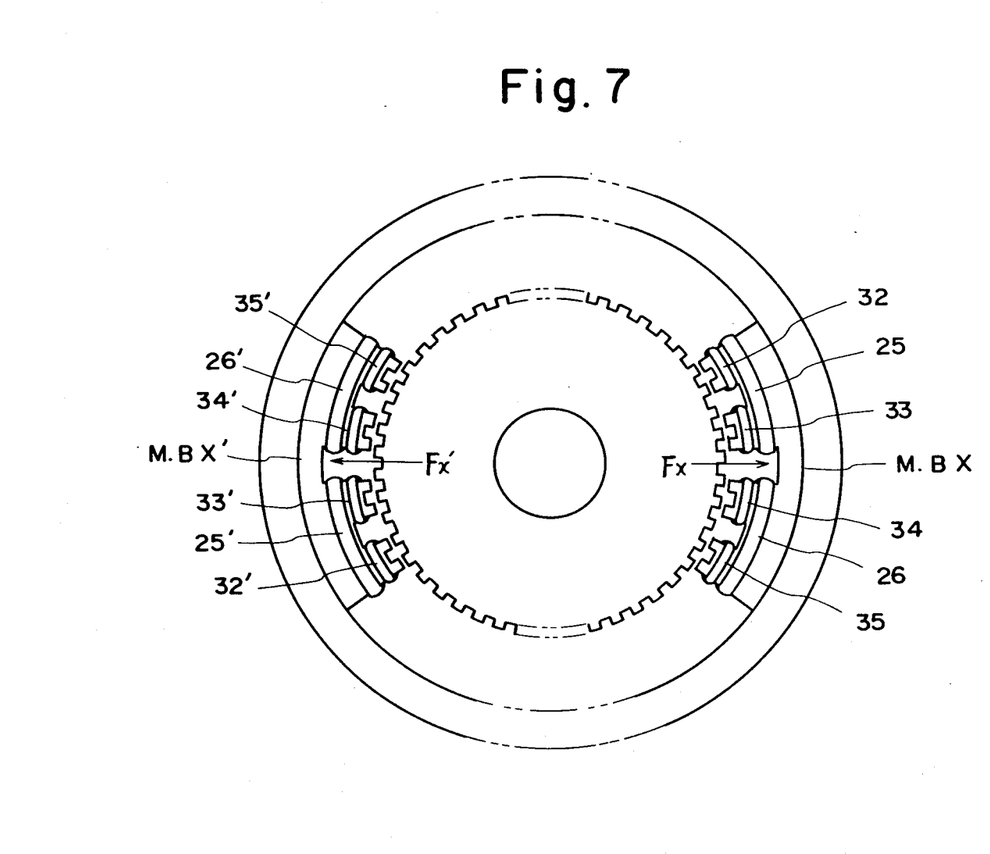

(2) The difference between the attracting forces from the symmetrically located electromagnet blocks X, X' is the force that actually acts upon the rotor. Accordingly, as for the positional relationship among the magnetic poles of the electromagnet blocks, positioning the electromagnet blocks X, X' symmetrically with respect to the center of the rotor, as shown in FIG. 7, will cancel any shift in the attracting direction away from the X axis if such a shift should occur due to the influence of the coils 32, 33, coils 32', 33', coils 34, 35, and coils 34', 35'. Thus, there is almost no influence overall on the attracting forces.

The function of a magnetic bearing and the control thereof can be achieved by thus arranging the electromagnet blocks. In such case, the attracting forces acting on the rotor can be controlled completely independently, without any influence upon the driving and positioning of the rotor, by controlling solely the excitation current Ic of the coils 25, 26.

Though the arrangement is now shown, magnetically floating support along the Y axis and the control thereof can be performed just as control along the X axis. This can be done by differentially controlling the magnetic flotation coil currents Iyc, Iyc' of the respective electromagnet blocks Y, Y'.

We will now describe control of the force acting upon the rotor in greater detail taking the X axis as an example.

A single electromagnet block subjects the rotor to an attracting force expressed by $$Fx = f(Ic) \approx f(Ico) + K\Delta Ic$$

That is, $$Fx \approx Fxo + K\Delta Ic$$

where Fxo represents the attracting force when Ic=Ico holds. Further, Ico represents a bias current, K a constant of proportionality, and ΔIc a minute change in Ic(Ic=Ico+αIc)

When two electromagnet blocks pull against each other, as shown in FIG. 7, the force acting along the X axis is expressed by $$FX - Fx' = (Fxo - Fxo') + K(\Delta Ic - \Delta Ic')$$

Since Fxo=Fxo', we have $$Fx - Fx' = K(\Delta Ic - \Delta Ic')$$

If the radial sensor 15 (FIG. 2) senses that the rotor has shifted in position, then, in order to apply a force in, say, the X direction to return the rotor to its position, the current of the electromagnet block X should be reduced by an amount proportional to this shift, namely by ΔIc. Obviously, the control circuitry is provided with a phase advancing circuit and the like for stabilization purposes.

Various magnetically floating actuators having an angular positioning function can be constructed by having the actuators function also as magnetic bearings through use of the electromagnet blocks.

Such an actuator corresponds to the conventional magnetic bearing of the type having five controlled degrees of freedom, as shown in FIG. 1. In addition to controlling the translation of the rotor along the three axes X, Y, Z as well as the two inclined motions of the rotor, the rotational angle of the rotor can also be controlled. More specifically, translation of the rotor along the X axis and inclined motion of the rotor in a plane (XZ plane) containing the X axis are controlled by measuring the gap via a pair of sensors $x_1$, $x_1'$ (not shown) and a pair of sensors $x_2$, $x_2'$ (not shown). Letting the change from the origin (neutral point) sensed by the pair of sensors $x_1$, $x_1'$ be $\Delta x_1$, and letting the change from the origin sensed by the sensor $x_2$ be $\Delta x_2$, the amount of translational movement can be obtained from $(\Delta x_1 + \Delta x_2)/2$, and the amount of inclined movement can be obtained from $\Delta x_1 - \Delta x_2$. The currents $\Delta Ic_1$, $\Delta Ic_2$ can be determined by the electronic control unit based on the signals produced by the above sensors. Control is performed in a like manner for motion along the Y axis based on a known technique employed in conventional magnetic bearings. Control of position along the Z axis is carried out using a method similar to that employed in conventional magnetic bearings based on the output of the thrust sensor 16 (FIG. 2). Note that the thrust bearing unit 14 may be disposed between the radial units if desired.

To control the rotational angle of the rotor, currents should be supplied in such a manner that the currents Ia, Ib of each electromagnetic block satisfy the equations Ia=Io sin α, Ib=Io cos α. Ordinarily, the currents Ia, Ib are applied sequentially in the manner of the waveforms shown in FIG. 8(a) in accordance with the input pulses shown in FIG. 8(b). The rotor may thus be rotated smoothly and positioning can be performed in very small angular increments. The rotor can be positioned in angular increments of $2\pi/N \cdot m$ (rad), where N represents the number of teeth formed on the rotor and m represents the number of ministep partitions.

Figure 9:
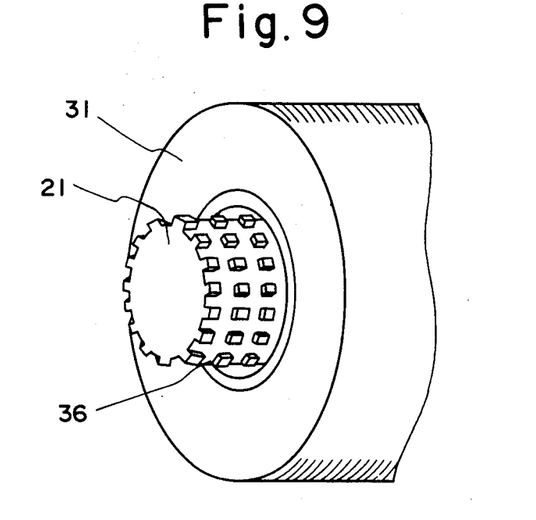
FIGS. 9 and 10 are views for describing axial support means in the electromagnet block.
Figure 10:
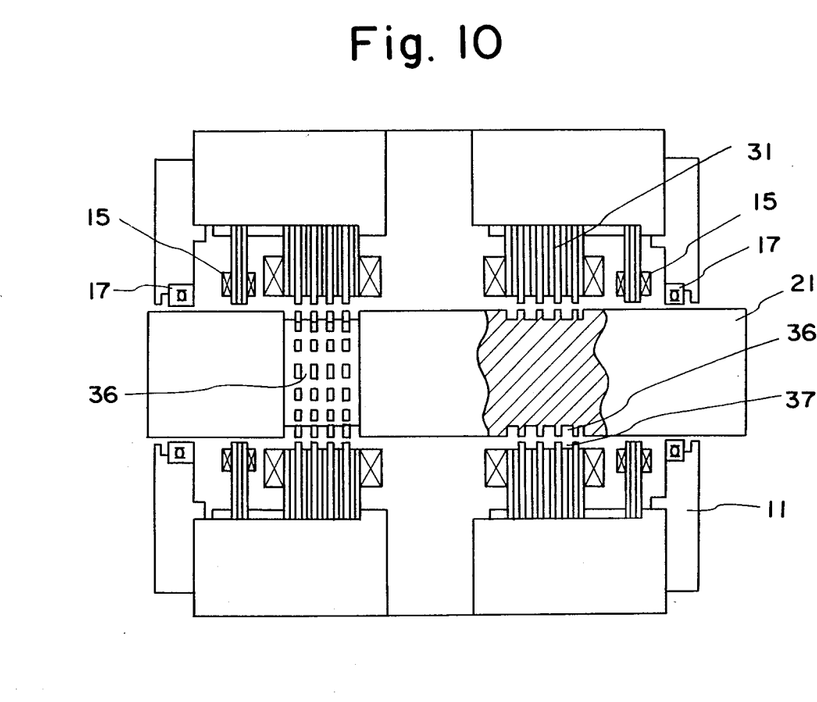

In the above-described embodiment, the rotor is controlled in the axial direction (i.e., along the Z axis) by using the electromagnets which constitute the thrust bearing 14 (FIG. 2). However, as shown in FIGS. 9 and 10, an arrangement can be adopted in which the rotor is formed to have grooves 36 at a predetermined pitch in a direction crossing the teeth of the rotor, and each electromagnet block is also formed to include grooves 37 having the same pitch at the portion of the block opposing the grooves 36. In other words, mesh-like teeth are formed in the axial direction as well as in the circumferential direction. With this arrangement, it is possible to obtain a holding force that suppresses movement in the axial thrust direction since an attracting force acts to minimize the gap between opposing mesh-like teeth. Accordingly, it is possible to retain the rotor along the Z axis without separately providing the thrust bearing 14 and sensor 16 as shown in FIG. 2. An actuator of this type is ideal for a case where the rotor is used in a horizontal attitude and the load in the axial direction is small. Further, the number of teeth along the Z axis can be set at will in relation to the axial load.

Though eight of the electromagnet blocks are provided in the basic configuration (i.e., four blocks in each unit 13 and 13', respetively, the number can be adjusted upon taking into consideration such factors as the load upon the rotor. Theoretically, at least a pair of the electromagnet blocks should be provided. In addition, the teeth may be formed solely on the portion of the rotor opposing the electromagnet blocks capable of performing the function of the stepping motor simultaneously.

Figure 11:
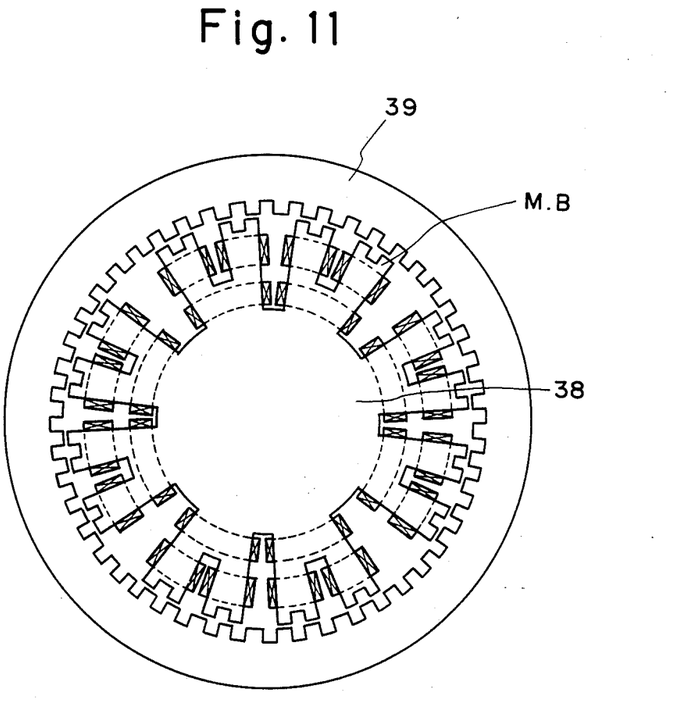
FIG. 11 is a view for describing an outer rotor-type actuator.
Figure 12:
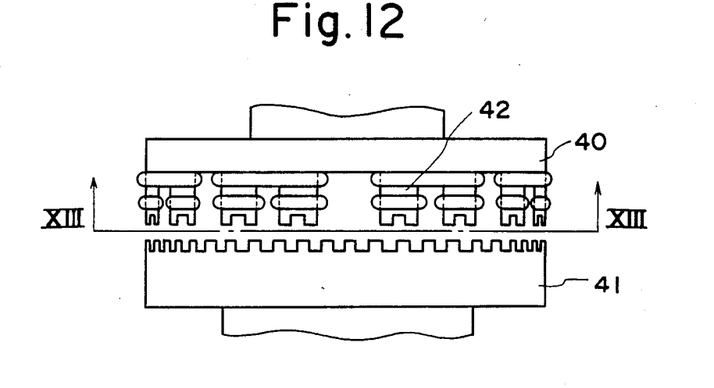
FIGS. 12 and 13 are views for describing a disk-type actuator.
Figure 13:
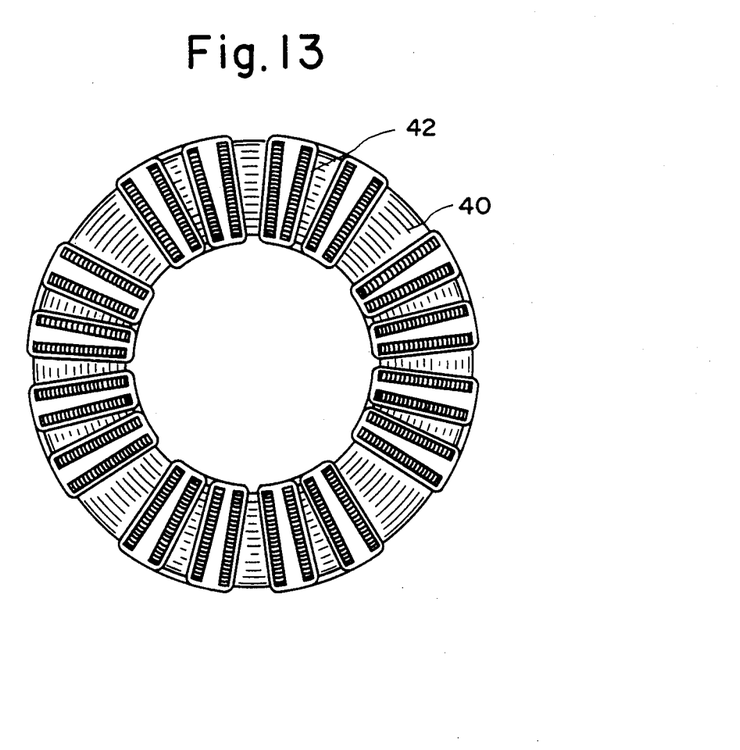

Though the basic configuration described above has the rotor disposed at the center of the stator, an outer rotor-type arrangement can be adopted, as shown in FIG. 11. In this configuration, a stator 38 having electromagnet blocks arranged about the periphery thereof is provided. Encircling the stator 38 is a rotor 39 formed to include teeth at a predetermined pitch opposing the electromagnet blocks. The basic configuration can be modified into a disk-shaped configuration of the type shown in FIGS. 12 and 13. Using an actuator of this type enables utilization as a thrust bearing unit having an angular positioning function. For example, a disk-shaped stator 40 having an electromagnet block 42 provided on its periphery can be attached to a ceiling or the like, and a rotor 41 in the form of a movable disk the peripheral portion of which is provided with teeth at a predetermined pitch can be suspended by electromagnetic force. With such an arrangement, the disk-shaped rotor 41 can be rotated and its inclination can be controlled by adjusting the currents fed through the magnetic flotation coils of the electromagnet block 42. Accordingly, the arrangement is ideal for a table which rotates in a contactless state.

Figure 14:
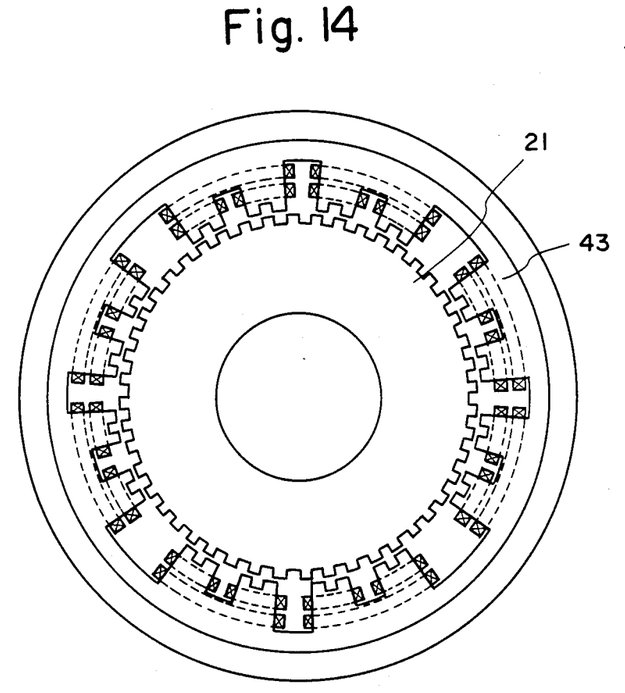
FIG. 14 is a sectional view of an actuator and illustrates another embodiment of a core member.
Figure 15:
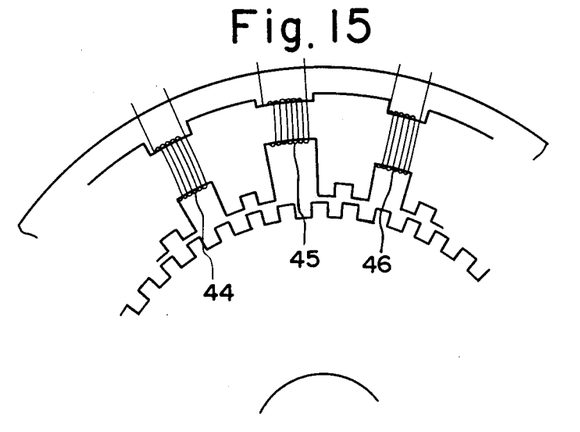
FIG. 15 is a partial structural view showing another embodiment of an electromagnet block.

As shown in FIG. 14, the electromagnet blocks X, X', Y, Y' arranged in the same plane need not necessarily be magnetically independent of one another but can be integrated in linked form, as illustrated. In this case, a single linked silicon steel plate 43 is fabricated to form all of the poles and a plurality thereof are stacked. The manner in which the coils are wound is different from that of FIG. 4. As shown in FIG. 15, the design should be such that magnetomotive forces of the kind shown in FIG. 5a are generated by coils 44, 45, 46 for each magnetic pole.

Since this actuator is of the magnetically floating (contactless) type, mechanical damping with respect to rotational motion is very small. Accordingly, there is some vibration even if ministep drive is used. This vibration can be controlled in the following manner. Specifically, since the circuit which passes the currents through the coils 32, 33, 34, 35 generally is driven by a constant current power supply for supplying the currents as shown in FIG. 8, namely a circuit for controlling current upon detecting current values as shown in FIG. 8, electrical damping cannot be achieved. Accordingly, if drive is carried out by using a constant voltage power supply for supplying the coils with voltages of the kind shown in FIG. 8 instead of relying upon the constant current power supply, rotation can be electrically damped. This damping is produced by a back electromotive force that accompanies rotation of the motor. The magnitude of this damping is maximum at two-phase excitation stability points and minimum at the position of single-phase stability points.

Accordingly, the positions of the electromagnet blocks are determined so as to bring the single-phase stability point of the electromagnet block M.B Y including at least a pair of stator members shown in FIG. 3 into coincidence with the position of the two-phase stability point of the electromagnetic block M.B X, including at least a pair of stator members and a phase shift of $\pi/4$ is established between the phases of the voltages supplied to the electromagnetic blocks M.B Y, M.B X. As a result, the damping characteristic can be made to assume an approximately constant value without being dependent upon the angular position of the rotor. Torque can also be made uniform to achieve smooth drive. These measures are important in view of the fact that damping caused by mechanical friction as in a mechanical bearing cannot be obtained with a magnetic bearing.

Thus, according to the present invention as described above, a magnetically floating actuator having an angular positioning funcction is provided, which actuator is simplified in structure and made compact in size by integrating a magnetic bearing and the rotation control mechanism of a rotor. In addition, the electromagnet blocks for rotation control are made to perform the function of a thrust bearing without specially providing a thrust bearing. This reduces the number of component parts and results in a more maintenance-free structure. Moreover, vibration of the rotor can be prevented to enhance controllability.

The present invention can be applied in a wide variety of technical fields by exploiting the above advantages. The actuator of the present invention is capable of functioning even in harsh environments and is expected to find application in the industries of the future, particularly in semiconductor manufacturing plants, biotechnology plants and factories located in the vacuum of outer space.

As many apparently widely different embodiments of the present invention can be made without departing from the spirit and scope thereof, it is to be understood that the invention is not limited to the specific embodiments thereof except as defined in the appended claims.

What we claim is:

1. A magnetically floating actuator having an angular positioning function, comprising:
   a rotor having surface teeth spaced circumferentially at a predetermined pitch;
   a stator comprising a core member having poles arranged in a plurality of pole groups, said groups being arranged in diametrically opposite pairs of groups and said stator including at least two circumferentially spaced pairs of said pole groups;
   each pole group including a plurality of poles formed with spaced teeth juxtaposed to said rotor teeth to form a stepping motor; and
   a plurality of winding means on each said pole group, said winding means comprising a first winding means having at least one coil arranged on each pole group so as to control said pole group as a magnetic flotation means for said rotor and a second winding means comprising coils wound on said poles so as to constitute angular position means for said rotor as the rotor of said stepping motor about its axis of rotation.

2. The actuator according to claim 1, wherein said rotor is in the form of a disk and has the teeth formed on a face of the disk and said stator is formed to have magnetic poles opposing said teeth.

3. The actuator according to claim 1, wherein said rotor is disposed on the outer side of said stator so as to encircle said stator.

4. The actuator according to claim 3, wherein said stator comprises at least two pairs of stator members arranged symmetrically with respect to the center of said rotor.

5. The actuator according to claim 4, wherein said core member comprises a single stack of magnetic plates forming said poles.

6. The actuator according to claim 4, wherein said second winding means are supplied with phase-controlled voltages so that a position of a single-phase excitation stability point of one of said pairs of stator members coincides with a position of a two-phase excitation stability point of the other of the said pairs of stator members, and each pair of stator members is supplied with a voltage, the phase of the voltage supplied to one pair being shifted by $\pi/4$ with respect to the voltage applied to the other pair.

7. A magnetically floating actuator having an angular positioning function as recited in claim 1, wherein magnetic flux caused in said poles by said first winding means and magnetic flux caused in said poles by said second winding means combine to drive said rotor as said stepping motor.

8. An actuator as recited in claim 7 wherein said spaced teeth formed on each said stator pole have the same pitch as said rotor teeth, and wherein each said group of poles comprises two pairs of poles so arranged that when a first pole of a first pair has its teeth aligned with those of the rotor, the second pole of the first pair has its teeth displaced by $\frac{1}{2}$ pitch, a first pole of said second pair has its teeth displaced by $\frac{1}{4}$ pitch, and the second pole of the second pair has its teeth displaced by $\frac{3}{4}$ pitch, respectively, relative to the pitch of the rotor teeth.

9. A magnetically floating actuator having an angular positioning function, comprising:
   a rotor having teeth formed at least on a portion of an area opposing magnetic poles of a stator and circumferentially spaced at a predetermined pitch, and
   wherein said stator includes rotor magnetic flotation means and rotation control means provided on a core member formed with magnetic poles having teeth opposing said rotor teeth, said stator comprising at least two pairs of stator members, and being so arranged that a position of a single-phase excitation stability point of one of said pairs of stator members coincides with a position of a two-phase excitation stability point of the other of said pairs of stator members, and each pair of stator members is supplied with a voltage, the phase of the voltage supplied to one pair being shifted by $\pi/4$ with respect to the voltage applied to the other pair, whereby axial movement of said rotor is suppressed.

* * * * *